(12) United States Patent
Chakraborty et al.

(10) Patent No.: US 8,804,153 B2
(45) Date of Patent: Aug. 12, 2014

(54) METHOD FOR PRINTING ON AN IMAGING DEVICE

(75) Inventors: Tukun Chakraborty, Karnataka (IN); Zakir Ahmed, Karnataka (IN); Debjit Roy, Vancouver, WA (US); Kah Kit Cheong, Singapore (SG); Kok Mun Stephen Cheng, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 1138 days.

(21) Appl. No.: 12/530,714

(22) PCT Filed: Apr. 16, 2007

(86) PCT No.: PCT/IN2007/000147
§ 371 (c)(1),
(2), (4) Date: Nov. 13, 2009

(87) PCT Pub. No.: WO2008/126096
PCT Pub. Date: Oct. 23, 2008

(65) Prior Publication Data
US 2010/0110469 A1  May 6, 2010

(51) Int. Cl.
*G06K 15/00* (2006.01)
*H04L 9/32* (2006.01)
*H04L 29/06* (2006.01)
*H04N 1/04* (2006.01)

(52) U.S. Cl.
USPC ......... 358/1.14; 358/1.16; 358/474; 713/151; 713/176

(58) Field of Classification Search
CPC .................................................. G06F 2201/835
See application file for complete search history.

(56) References Cited

U.S. PATENT DOCUMENTS

| | | | |
|---|---|---|---|
| 6,618,168 B1 * | 9/2003 | Nakajima et al. | 358/1.16 |
| 6,711,677 B1 * | 3/2004 | Wiegley | 713/151 |
| 2003/0204731 A1 | 10/2003 | Pochuev et al. | |
| 2006/0050303 A1 | 3/2006 | Oomori et al. | |
| 2006/0072144 A1 | 4/2006 | Dowling et al. | |
| 2006/0181729 A1 * | 8/2006 | Kuribara | 358/1.14 |
| 2007/0086061 A1 * | 4/2007 | Robbins | 358/400 |
| 2007/0172281 A1 * | 7/2007 | Inoue et al. | 400/62 |

OTHER PUBLICATIONS

European Patent Office; International Search Report and Written Opinion, PCT/IN2007/000147; Oct. 29, 2007; 13 pgs; Netherlands.

* cited by examiner

*Primary Examiner* — Marivelisse Santiago Cordero
*Assistant Examiner* — Moustapha Diaby (57) ABSTRACT

A method for printing a print ready file transmitted by a print client on an imaging device includes creating a print data file associated with the print ready file, where the print data file includes information pertaining to the print ready file and the imaging device. In the method, the print data file is encrypted and transmitted to the imaging device. In addition, the print data file is authenticated in the imaging device and printing of the print ready file is enabled if the print data file is determined to be authentic and the print ready file is invalidated if the print data file is determined to be inauthentic. Also disclosed is an imaging device configured to perform the aforementioned method.

18 Claims, 6 Drawing Sheets

METHOD FOR PRINTING ON AN IMAGING DEVICE

BACKGROUND

Printer manufacturers oftentimes employ business models in which they receive revenue from customers based upon the customers' use of the printers. In these types of business models, the printer manufacturers charge customers fees that are derived from accountable print parameters like amount of ink or toner the customers use, the number of sheets printed by the customers, or the print quality. To track the printer usage, the print jobs rendered by a printer driver are registered in an accounting database maintained by the printer manufacturer. In addition, the accountable print parameter is matched with the print jobs registered in the accounting database.

However, in various situations, users have been able to use the printer driver of a first printer to print on a second printer, for instance, if a print job rendered by the printer driver of the first printer is printable on the second printer. This may occur, for example, if both printers support the same page description language. In this case, the amount of ink or toner used, or the number of sheets printed, by a particular printer will not match the usage data stored in the accounting database and a user will be able to print documents without being charged for those documents. As such, users have been able to circumvent use of the proper printer driver for a particular printer, resulting in lost revenue for printer manufacturers.

Conventional solutions to these types of problems require that the print jobs be manually verified with various printer statistics, such as, number of pages printed and print quality. This type of manual verification, however, is labor-intensive and adds significant costs to implementing the usage-based printing business model discussed above.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a method and system for printing a print ready file transmitted by a print client on an imaging device. The disclosed method is configured to substantially prevent misuse, and thus, lost revenue from implementing a business model in which users are charged according to their level of printer use. As discussed in greater detail herein below, the misuse is substantially prevented through the addition of safeguards by a printer driver operating in the print client. The safeguards include the creation of a print data file associated with the print ready file.

The print data file includes information pertaining to the print client, the print ready file, and the imaging device by which the print ready file is intended to be printed. The print data file may be encrypted prior to being transmitted to the imaging device. The imaging device may authenticate the print data file and may be configured to print the print ready file when the print data file is determined to be authentic. If the imaging device is unable to authenticate the print data file, the print ready file may be deemed invalid, and may thus be discarded, erased, etc.

Through implementation of the method and system disclosed herein, print ready files that are submitted to the imaging device from improper print clients, such as print clients that do not have the appropriate printer driver, will be deemed invalid and will not be printed. In addition, even in situations where the print client has the appropriate printer driver installed thereon, the method and system disclosed herein may substantially prevent users from being able to print additional copies of the print ready file on the imaging device.

Figure 1:
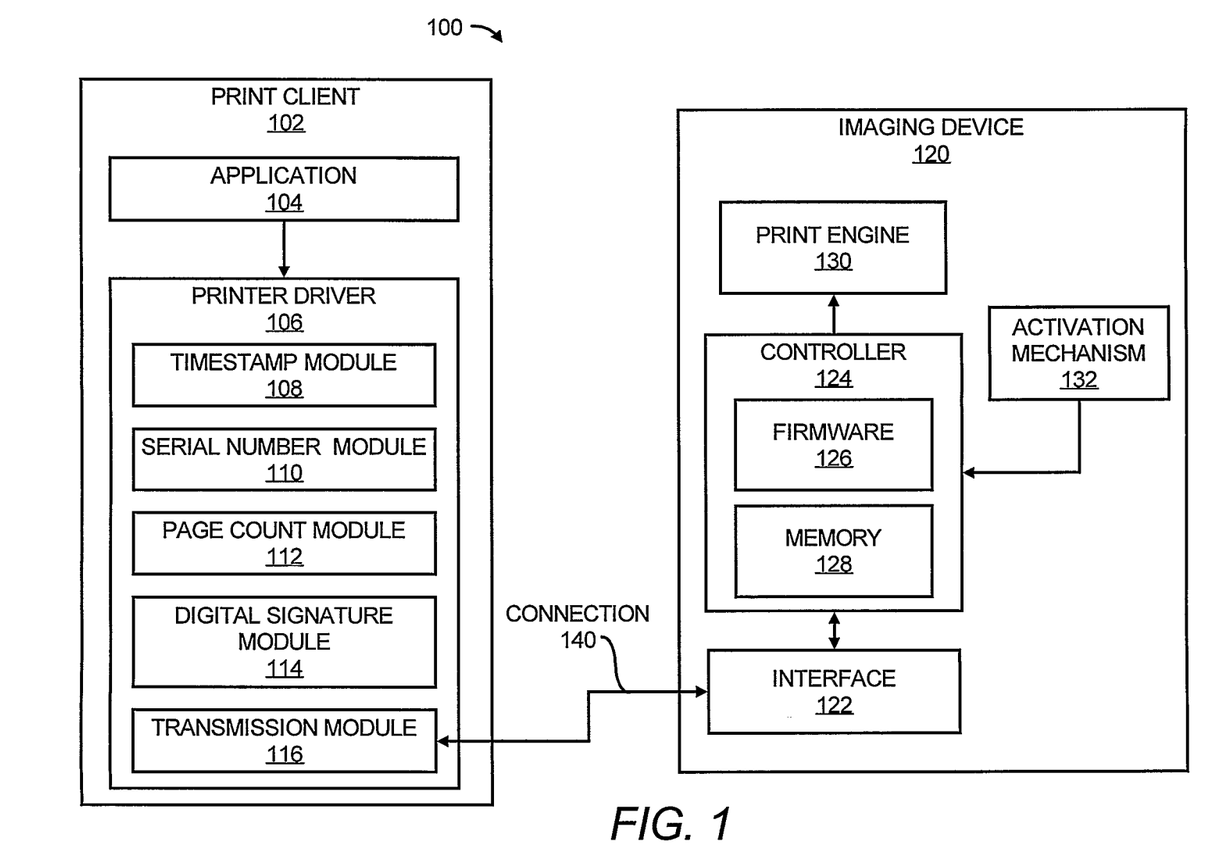
FIG. 1 shows a block diagram of a printing system configured to implement various operations disclosed herein, according to an embodiment of the invention.

With respect first to FIG. 1, there is shown a block diagram of a printing system 100 configured to implement various operations disclosed herein, according to an example. It should be understood that the following description of the printing system 100 is but one manner of a variety of different manners in which the printing system 100 may be configured. In addition, it should be understood that the printing system 100 may include additional components and that some of the components described herein may be removed and/or modified without departing from a scope of the computerized tool 100. For instance, the printing system 100 may include any number of print clients 102 and imaging devices 120.

As shown in FIG. 1, a print client 102 is connected to an imaging device 120 through a connection 140. The print client 102 may comprise a personal computer, laptop computer, portable digital assistant, or other computing device capable of generating a printable data file. The imaging device 120 may comprise a laser printer, an ink jet printer, an impact printer, a facsimile machine, a multifunction printer, or the like.

The connection 140 may comprise a direct connection between the print client 102 and the imaging device 120 using a parallel or serial cable, a wireless or remote connection via a telecommunication link, an infrared link, a radio frequency link, a Bluetooth™ link, or other connector or communication system that establishes a bi-directional communication between the print client 102 and the imaging device 120. In addition, or alternatively, the connection 140 may comprise an internal network connection, such as, an intranet, or an external network connection, such as, the Internet. As a further alternative, a network server (not shown) may be positioned in the connection 140 between the print client 102 and the imaging device 120.

With reference back to FIG. 1, the print client 102 has an application 104 and an associated printer driver 106, stored, for instance, in its memory (not shown). The print client 102 may also include a controller (not shown), such as, a microprocessor, a micro-controller, an application specific integrated circuit (ASIC), or other suitable device capable of performing various functions in the print client 102, configured to invoke or otherwise implement the application 104 and the printer driver 106. In addition, the application 104 may comprise any reasonably suitable type of software application capable of receiving or generating a file configured to be printed by the imaging device 120.

The printer driver 106 is configured to receive a print ready file from the application 104 and to convert the print ready file into a format suitable for printing by the imaging device 120. In addition to this function, the printer driver 106 is configured to perform various security steps on the print ready file prior to forwarding the print ready file to the imaging device 120 for printing. In performing the various security steps, the printer driver 106 may invoke or implement various modules, which may, for instance, comprise software units that may be compiled separately, to create a print data file pertaining to the print ready file.

As used throughout the present disclosure, the terms "print ready file" may be defined as including a file, such as, a text file, an image file, or other file that may be submitted by the print client 102 for printing by the imaging device 120. In addition, the terms "print data file" may be defined as including data pertaining to the print ready file and may include the print ready file itself. In another example, the print data file may comprise a revised version or a version of the print ready file in which the print data file has been appended. In a further example, the print data file may comprise metadata associated with the print ready file. In any regard, and as described in greater detail herein below, the imaging device 120 may employ the information contained in the print data file to authenticate a print job prior to printing the print ready file associated with the print data file.

The printer driver 106 is depicted as including a timestamp module 108, a serial number module 110, a page count module 112, a digital signature module 114, and a transmission module 116. In the following description of the modules 108-116, although the printer driver 106 is recited as implementing the modules 108-116 to perform various tasks, it should be understood that a controller (not shown) of the print client 102 may invoke or implement the printer driver 106, and thus, the modules 108-116 to perform the various tasks.

The printer driver 106 may implement the timestamp module 108 to obtain and attach a timestamp of the print client 102 current time to the print data file. The printer driver 106 may implement the serial number module 110 to obtain and attach the serial number of the imaging device 120 selected to perform the print job to the print data file. The printer driver 106 may implement the page count module 112 to obtain and attach the total number of pages contained in the print ready file. The printer driver 106 may implement the digital signature module 114 to encode the print data file. In addition, the printer driver 106 may implement the transmission module 116 to transmit the encoded print data file, including the print ready file, to the imaging device 120.

Although the printer driver 106 has been described as including separate modules 108-116 for performing the various functions discussed above, it should be understood that the functions of one or more of the modules 108-116 may be combined into one or more modules without departing from a scope of the printing system 100.

As further shown in FIG. 1, the imaging device 120 includes an interface 122 through which the imaging device 120 is configured to bi-directionally communicate with the print client 102. The interface 122 may include, for instance, a parallel input/output port or channel, a serial input/output port or channel, an enhanced input/output port or channel, an Ethernet port or channel, an infrared or Bluetooth™ port, combinations thereof, or the like.

The imaging device 120 also includes a controller 124 configured to control the operations of the imaging device 120. The controller 120 may comprise a microprocessor, a micro-controller, an application specific integrated circuit (ASIC), or other suitable device capable of performing various imaging functions, such as, printing, scanning, faxing, etc. As shown, the controller 120 includes firmware 126 and memory 128, such as, random access memory (RAM), for performing these functions.

In one regard, the firmware 126 differs from firmware associated with conventional imaging devices because the firmware 126 is designed to implement various security steps to substantially reduce or eliminate misuse of the imaging device 120. The firmware 126 may thus be programmed to include various security steps to be performed by the controller 120. In addition, firmware 126 may comprise a read only memory (ROM) that may replace a ROM in an existing imaging device to thereby enable the existing imaging device to perform the various security steps discussed herein.

The imaging device 120 may also be equipped with an activation mechanism 132 configured to enable activation and deactivation of the various security steps discussed herein. Use of the activation mechanism 132 may substantially be restricted through the use of a password or other type of protection scheme.

The controller 124 may also include various electronics for connecting the controller 124 to the interface 122, the firmware 126 and the memory 128. The controller 124 may also include electronics for connecting the controller 124 to a print engine 130, which the controller 124 may implement in printing the print ready file. As discussed below, the controller 124 may activate the print engine 130 to print the print ready file following a determination that the print data file is authentic. The controller 124 may further include electronics for connecting the controller 124 to the activation mechanism 132.

Figure 2:
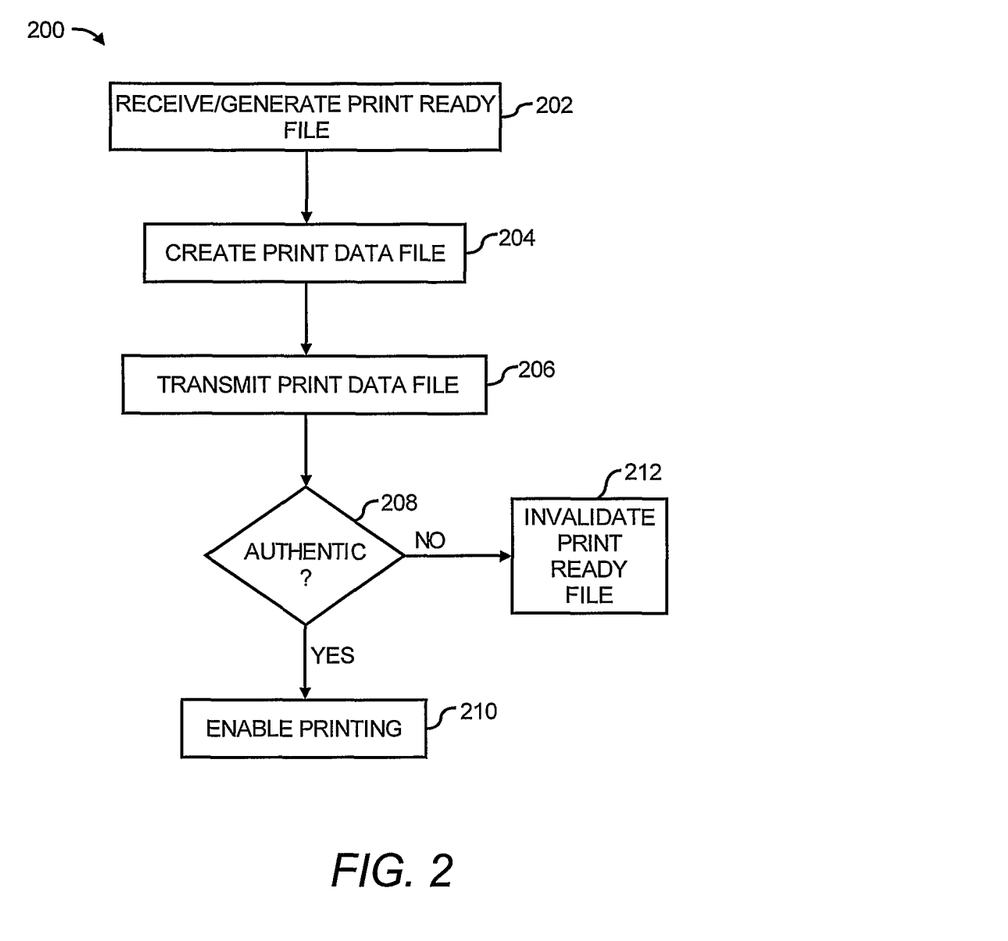
FIG. 2 shows a flow diagram for printing a print ready file transmitted by a print client on an imaging device, according to an embodiment of the invention.

Various security operations implemented in performing a printing operation on the imaging device 120 that is initiated by the print client 102 will be described with regard to the flow diagram depicted in FIG. 2. FIG. 2, more particularly, depicts a flow diagram of a method 200 for printing a print ready file transmitted by a print client 102 on an imaging device 120, according to an example. It should be understood that the following description of the method 200 is but one manner of a variety of different manners in which such a method 200 may be implemented. In addition, it should be understood that the method 200 may include additional steps and that some of the steps described herein may be removed and/or modified without departing from a scope of the method 200.

At step 202, the print client 102 may receive or generate a print ready file. In one example, the print client 102 may invoke or otherwise implement the application 104 to receive the print ready file from an external source, such as, for instance, the Internet, a removable storage media, etc. In another example, a user may implement the application 104 in the print client 102 to generate the print ready file, which may comprise, for instance, a text document, a spreadsheet, a drawing, a picture, etc. In any case, the print client 102 invokes or otherwise implements the printer driver 106 to create a print data file pertaining to the print ready file, as indicated at step 204.

The print data file generally includes information designed to prevent abuse of business models that charge customers based upon the customers' use of imaging devices. In other words, the print data file includes information designed to substantially prevent print ready files from being printed on unintended printers, to substantially prevent pages, in addition to the pages intended to be printed, from being printed, to substantially prevent unauthorized computing devices from being able to perform print jobs on the imaging device 120, such as those computing devices having improper printer drivers, etc.

The print data file includes information pertaining to the print ready file and the imaging device 120. The information pertaining to the print ready file may include the number of pages contained in the print ready file. In addition, the information pertaining to the imaging device 120 may include the imaging device 120 timestamp. Moreover, the information pertaining to the imaging device 120 may include the serial number of the imaging device 120 as well as the public key associated with the private key stored in the imaging device 120. A more detailed discussion of a manner in which the print data file may be created at step 204 is discussed herein below with respect to FIG. 3.

At step 206, the print client 102 invokes or otherwise implements the transmission module 116 of the printer driver 106 to transmit the print data file, which includes the print ready file, to the imaging device 120. The controller 124 of the imaging device 120 processes the print data file to determine whether the print data file is authentic at step 208. A more detailed description of a manner in which the controller 124 authenticates the print data file is discussed in greater detail herein below with respect to FIGS. 4A and 4B.

If the controller 124 determines that the print data file is authentic at step 208, the controller 124 operates the print engine 130 to print the print ready file, as indicated at step 210. However, if the controller 124 determines that the print data file is unauthentic at step 208, the controller 124 invalidates the print ready file at step 212. In this instance, the controller 124 may cause the print data file, including the print ready file, to be consumed, discarded, erased, etc.

According to an example, the imaging device 120 is equipped with a mechanism configured to enable users with the ability to activate or deactivate the method 200. If thusly equipped, the mechanism may be password protected or protected in various other ways to substantially prevent abuse of the mechanism.

Figure 3:
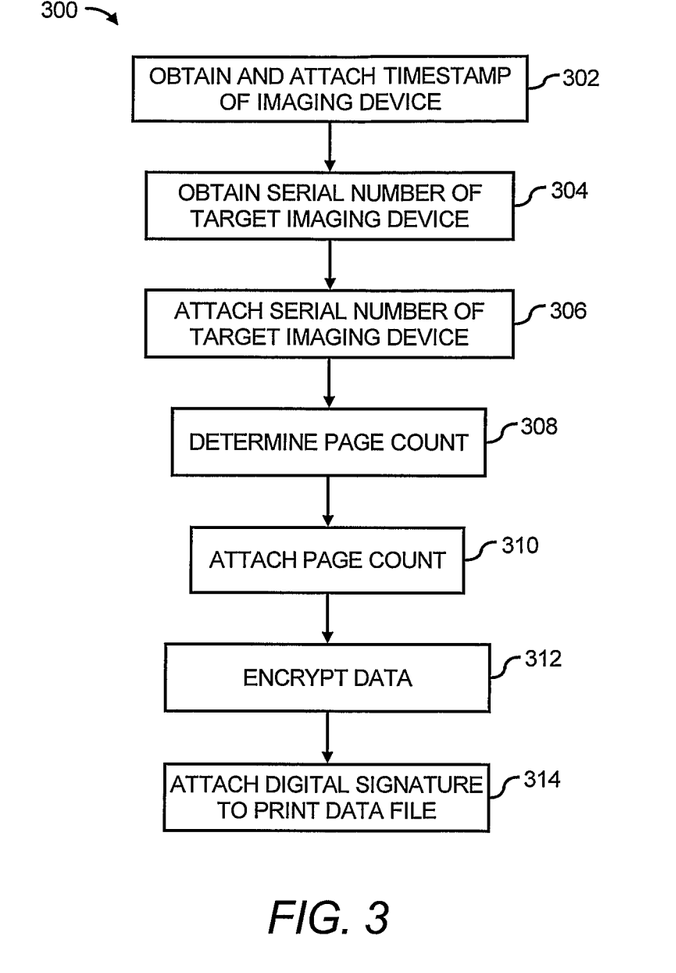
FIG. 3 illustrates a flow diagram of a method for creating a print data file, according to an embodiment of the invention.

With reference now to FIG. 3, there is shown a flow diagram of a method 300 for creating a print data file, according to an example. The method 300 may therefore depict the step 204 of creating a print data file in FIG. 2 in greater detail. It should be apparent to those of ordinary skill in the art that the method 300 represents a generalized illustration and that other steps may be added or existing steps may be removed, modified or rearranged without departing from a scope of the method 300.

At step 302, the printer driver 106 may implement the timestamp module 108 to obtain and attach a timestamp of the imaging device 120 current time to the print data file. As described in greater detail herein below, the controller 124 uses the timestamp of the imaging device 120 current time to substantially prevent users from printing the same job more than once without the authentication process disclosed herein being performed in the print job.

At step 304, the printer driver 106 may implement the serial number module 110 to obtain the serial number of the imaging device 120, which may be defined as a sequence of characters designed to substantially uniquely distinguish the imaging device 120 from other devices. In one example, the printer driver 106 queries the imaging device 120, and more particularly, the controller 124, to obtain the imaging device 120 serial number. In another example, the imaging device 120 serial number may have previously been programmed with the printer driver 106. In the latter example, therefore, at step 304, the printer driver 106 obtains the imaging device 120 serial number from a memory of the print client 102.

In either example, at step 306, the printer driver 106 attaches the imaging device 120 serial number to the print data file. In one regard, the imaging device 120 serial number is attached to the print data file to substantially ensure that the print ready file only prints on the desired imaging device 120.

At step 308, the printer driver 106 may implement the page count module 112 to determine the number of pages (page count) contained in the print ready file configured to be printed. For instance, the printer driver 106 determines the page count by determining the number of pages contained in the print ready file from, for instance, metadata associated with the print ready file. The printer driver 106 may additionally attach the page count to the print data file, as indicated at step 310. The page count of the print ready file may be attached to the print data file to, for instance, substantially prevent unauthorized pages from being printed by the imaging device 120.

At step 312, the printer driver 106 may implement the digital signature module 114 to encrypt the print data file. In one example, the printer driver 106 encrypts the print data file without encrypting the print ready file. In another example, the printer driver 106 encrypts both the print data file and the print ready file. In either example, the printer driver 106 feeds the print data file to a message digest algorithm, which generates a hash code. In addition, the printer driver 106 digitally signs the hash code using a public key stored in the print client 102 memory. The public key may have been previously received from the imaging device 120, or from a key server (not shown), such as, for instance, when the printer driver 106 was installed in the print client 102. Because the serial number of the imaging device 120 is attached to the print data file and may be used to differentiate different imaging devices, a single pair of private and public keys is sufficient for different imaging devices.

According to an example, the imaging device 120 advertises the public key, using a device management protocol, such as, SNMP, for example, or from a key server. In the latter case, the imaging device 120 is configured to register itself, using information that uniquely identifies the imaging device 120, such as the imaging device 120 serial number, and its public key with a query that identifies the imaging device 120. The key server then transmits the public key associated with the imaging device 120 to the print client 102.

In any regard, at step 314, the printer driver 106 may also implement the digital signature module 114 to attach the digital signature generated at step 312 to the print data file. In addition, the printer driver 106 may implement the transmission module to transmit the encrypted print data file to the imaging device 120, as indicated at step 206 (FIG. 2).

Figure 4A:
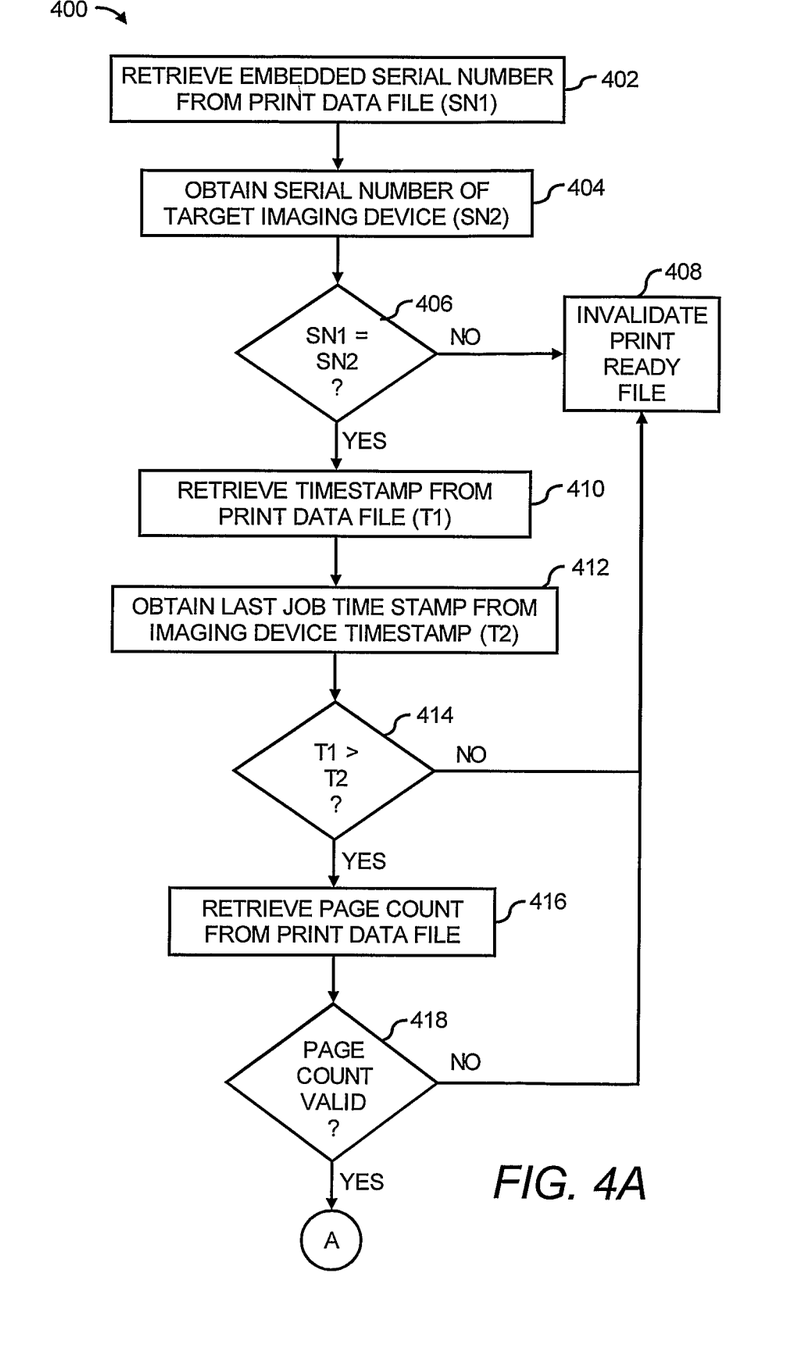
FIGS. 4A and 4B, collectively illustrate a flow diagram of a method for authenticating an encrypted print data file, according to an embodiment of the invention.
Figure 4B:
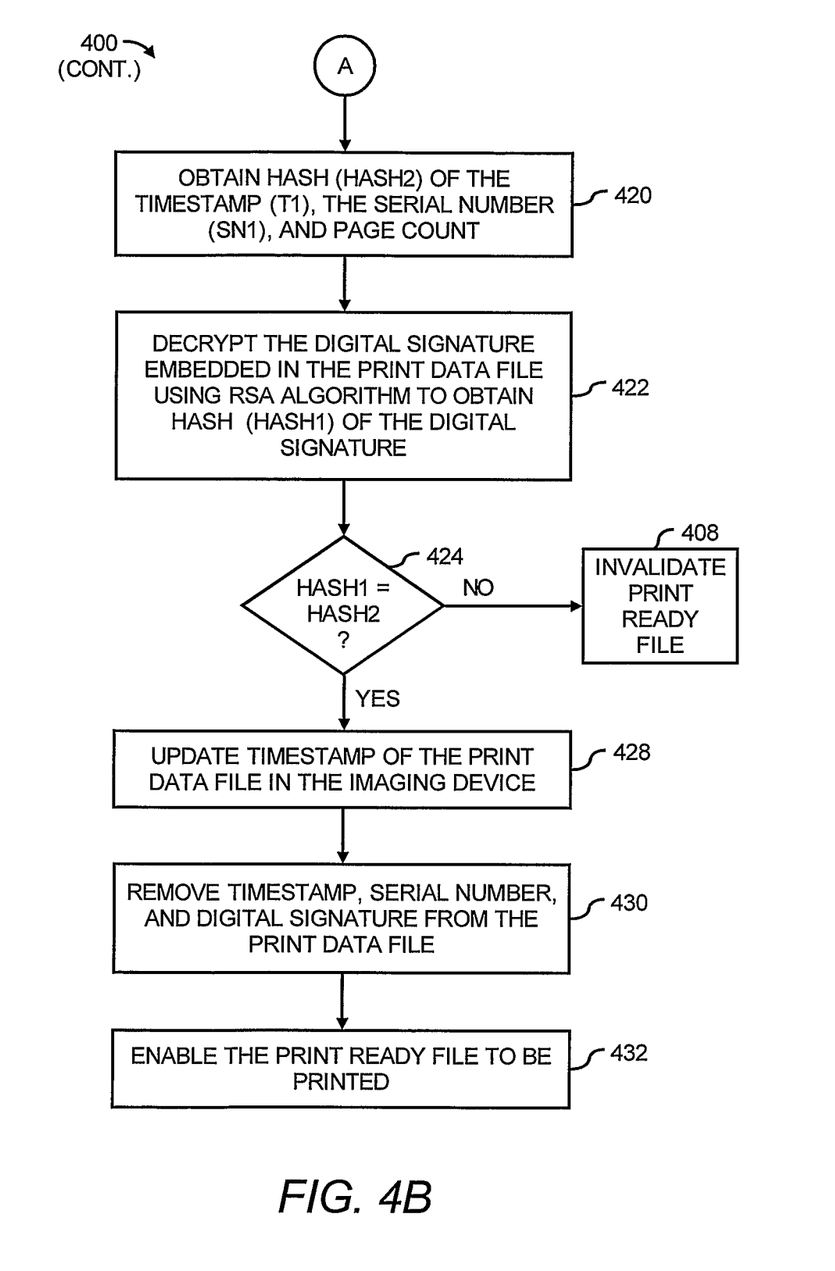

With reference now to FIGS. 4A and 4B, there is collectively shown a method 400 for authenticating an encrypted print data file, according to an example. The method 400 may therefore depict the step 208 of authenticating a print data file in FIG. 2 in greater detail. It should be apparent to those of ordinary skill in the art that the method 400 represents a generalized illustration and that other steps may be added or existing steps may be removed, modified or rearranged without departing from a scope of the method 400. By way of example, the order in which various data is obtained and processed in the method 400 may vary without departing from a scope of the method 400.

After the controller 124 has received the print data file from the print client 102, the controller 124 may implement the firmware 126 to retrieve a first serial number (SN1) of the imaging device 120 attached to the print data file, at step 402. In addition, the controller 124 obtains a second serial number (SN2) of the imaging device 120 from the firmware 126 or the memory 128, at step 404.

At step 406, the controller 124 determines whether the first serial number (SN1) retrieved from the print data file matches the second serial number (SN2) obtained from the imaging device 120. If the controller 124 determines that the first serial number (SN1) differs from the second serial number (SN2), the controller 124 may determine that the print data file is inauthentic and invalidates the print ready file at step 408. In this instance, the controller 124 may cause the print data file, including the print ready file, to be consumed, discarded, erased, etc.

If, however, the controller 124 determines that the first serial number (SN1) matches the second serial number (SN2), the controller 124 retrieves a first timestamp (T1) of the time attached to the print data file at step 302 (FIG. 3) from the print data file, as indicated at step 410. In addition, the controller 124 obtains a second timestamp (T2) of the last print job performed from the imaging device 120, as indicated at step 412.

At step 414, the controller 124 determines whether the first timestamp (T1) retrieved from the print data file exceeds the second timestamp (T2) of the imaging device 120. If the controller 124 determines that the first timestamp (T1) falls below the to second timestamp (T2), which corresponds to a "no" condition at step 414, the controller 124 determines that the print data file is inauthentic and may invalidate the print ready file at step 408, as described in greater detail herein above. In other words, at step 414, if the controller 124 determines that the second timestamp (T2) exceeds the first timestamp (T1), the controller 124 determines that an old print job is being submitted for re-printing, and may thus invalidate the print ready file.

If, however, the controller 124 determines that the first timestamp (T1) exceeds the second timestamp (T2), which corresponds to a "yes" condition at step 414, the controller 124 retrieves the page count from the print data file at step 416. In addition, the controller 124 determines whether the page count is valid at step 418. By way of example, the controller 124 may determine that the page count is valid at step 418, by determining whether the page count is an integer within a specified range.

If the controller 124 determines that the page count is invalid at step 418, the controller 124 determines that the print data file is inauthentic and may invalidate the print ready file at step 408, as described in greater detail herein above.

If, however, the controller 124 determines that the page count is valid at step 418, the controller 124 obtains a second hash (hash2) of the timestamp (T1), the first serial number (SN1), and the page count at step 420. In addition, at step 422, the controller 124 decrypts the digital signature attached to the print data file to obtain a first hash (hash1) of the time stamp (T1), serial number (SN1), and the page count attached to the print data file prior to signing of the print data file (step 314 in FIG. 3).

At step 424, the controller 124 determines whether the first hash (hash1) obtained from the digital signature at step 422 is equal to the second hash (hash2) obtained at step 420. If the controller 124 determines that the first hash (hash1) and the second hash (hash2) are not equal to each other, the controller 124 determines that the print data file is inauthentic and may invalidate the print ready file at step 408, as described in greater detail herein above.

If, however, the controller 124 determines that the first hash (hash1) and the second hash (hash2) are equal to each other, the controller 124 updates the second timestamp (T2) of the print data file in the imaging device 120, as indicated at step 428. The updated second timestamp (T2) may be stored in the imaging device 120 and may be transmitted to the print client 102 during a future print data file creation operation. As such, the updated second timestamp (T2) may be incremented to prevent old print jobs from being re-printed. In addition, at step 430, the controller 124 removes the timestamp, the serial number, and the digital signature from the print data file. The controller 124, furthermore, enables the print ready file to be printed at step 432. In other words, the controller 124 activates or otherwise initiates the print engine 130 to print the print ready file at step 432.

The operations set forth in the methods 200, 300, and 400 may be contained as a utility, program, or subprogram, in any desired computer accessible or readable medium. In addition, the methods 200, 300, and 400 may be embodied by a computer program, which can exist in a variety of forms both active and inactive. For example, it can exist as software program(s) comprised of program instructions in source code, object code, executable code or other formats. Any of the above can be embodied on a computer readable medium, which include storage devices, in compressed or uncompressed form.

Exemplary computer readable storage devices or media include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
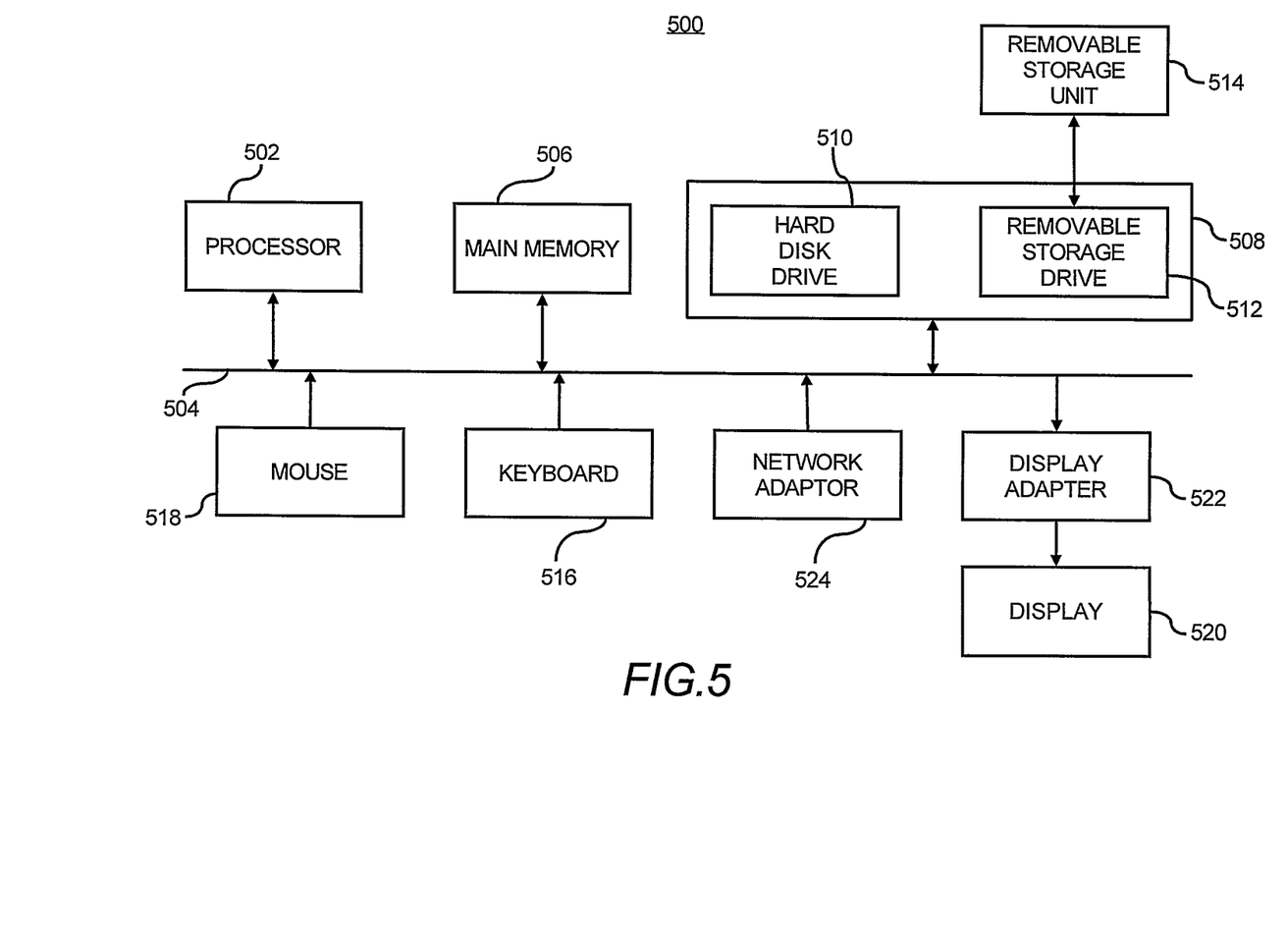
FIG. 5 illustrates a computer system, which may be employed to operate as either or both of the print client and the imaging device depicted in FIG. 1, according to an embodiment of the invention.

FIG. 5 illustrates a computer system 500, which may be employed to perform the various functions of either or both of the print client 102 and the imaging device 120 described hereinabove, according to an embodiment. In this respect, the computer system 500 may be used as a platform for executing one or more of the functions described hereinabove with respect to either or both of the print client 102 and the imaging device 120.

The computer system 500 includes one or more controllers, such as a processor 502. The processor 502 may be used to execute some or all of the steps described in the methods 200, 300, and 400. Commands and data from the processor 502 are communicated over a communication bus 504. The computer system 500 also includes a main memory 506, such as a random access memory (RAM), where the program code for, for instance, either of the printer driver 106 and the controller 124, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the printing method disclosed herein may be stored.

The removable storage drive 510 may read from and/or write to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as to limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for printing a print ready file on an imaging device, the method comprising:
   receiving, from a print client, a print data file that includes information pertaining to the print ready file and information pertaining to the imaging device, wherein the information pertaining to the imaging device includes a timestamp;
   obtaining a timestamp of a last job printed on the imaging device;
   determining whether the obtained timestamp exceeds the timestamp included in the print data file;
   determining if the print data file is authentic, wherein determining if the print data file is authentic further comprises determining that the print data file is not authentic if the obtained timestamp is determined to exceed the timestamp included in the print data file;
   enabling the print ready file to be printed if the print data file is determined to be authentic and invalidating the print ready file if the print data file is determined to not be authentic.

2. The method according to claim 1, wherein the information pertaining to the imaging device included in the print data file includes a serial number.

3. The method according to claim 2, wherein determining if the print data file is authentic comprises:
   obtaining a serial number of the imaging device;
   comparing the serial number included in the print data file with the serial number of the imaging device; and
   determining that the print data file is not authentic if the comparison reveals that the serial number included in the print data file differs from the serial number of the imaging device.

4. The method according to claim 1, wherein the information pertaining to the print ready file includes a page count.

5. The method according to claim 4, wherein determining if the print data file is authentic comprises:
   identifying a page count of the print ready file;
   comparing the page count included in the print data file with the identified page count; and
   determining that the print data file is not authentic if the comparison reveals that the identified page count differs from the page count included in the print data file.

6. The method according to claim 1, wherein the print data file includes an encrypted digital signature.

7. The method according to claim 6, wherein determining if the print data file is authentic comprises:
   decrypting the digital signature to identify a first hash;
   obtaining a second hash of the information pertaining to the print ready file and the information pertaining to the imaging device included in the print data file;
   comparing the first hash with the second hash; and
   determining that the print data file is not authentic if the first hash differs from the second hash.

8. The method according to claim 1, wherein:
   the information pertaining to the imaging device included in the print data file includes a serial number;
   the information pertaining to the print ready file included in the print data file includes a page count; and
   the print data file includes an encrypted digital signature.

9. The method according to claim 8, wherein determining if the print data file is authentic further comprises:
   comparing the included serial number with a serial number of the imaging device to determine if the included serial number is authentic;
   comparing the page count with the page count of the print ready file to determine if the included page count is authentic;
   decrypting the digital signature to identify a first hash;
   comparing the first hash with a second hash of the timestamp, the serial number, and the page count included in the print data file to determine if the first hash is authentic; and
   determining that the print data file is not authentic if at least one of the page count, the serial number, and the first hash is not authentic.

10. The method according to claim 9, further comprising:
    in response to a determination that the timestamp, the serial number, and the first hash are authentic, updating a timestamp of the print data file in the imaging device;
    removing the timestamp, the serial number, and digital signature from the print data file; and
    enabling the print ready file to be printed.

11. An imaging device comprising a print engine and a controller, wherein the controller is to:
    receive a print data file associated with a print ready file from a print client, the print data file including a timestamp, a serial number, and a page count;
    obtain a timestamp of a last job printed on the imaging device;
    determine whether the obtained timestamp exceeds the timestamp included in the print data file;
    determine that the timestamp included in the print data file is not authentic if the obtained timestamp is determined to exceed the included timestamp;
    determine whether the serial number included in the print data file is authentic based upon a comparison of the included serial number with a serial number of the imaging device;
    determine whether the page count included in the print data file is authentic based upon a comparison of the included page count with a page count of the print ready file; and
    activate the print engine to image the print ready file only in response to a determination that each of the timestamp, the serial number, and the page count is authentic.

12. The imaging device according to claim 11, wherein the print data file includes an encrypted digital signature and the controller is to:

decrypt the digital signature included in the print data file to identify a first hash;

obtain a second hash of the serial number, the page count, and the timestamp included in the print data file;

determine if the first hash is authentic based upon a comparison of the first hash with the second hash; and     activate the print engine to image the print ready file only in response to a determination that each of the timestamp, the serial number, the page count, and the first hash are authentic.

13. The imaging device according to claim 11, further comprising a bidirectional interface and wherein the controller is to cause the bidirectional interface to receive the print data file from the print client and to transmit the serial number of the imaging device to the print client.

14. The imaging device according to claim 11, further comprising firmware and wherein code for the controller is stored in the firmware.

15. The imaging device according to claim 11, further comprising a mechanism for activating and deactivating an authentication routine performed by the controller.

16. A non-transitory computer readable storage medium having computer executable instructions that when executed implement a method for printing a print ready file transmitted by a print client to an imaging device, the computer executable instructions including code to:

receive, from the print client, a print data file that includes information pertaining to the print ready file and information pertaining to the imaging device, wherein the information pertaining to the imaging device includes a timestamp;

obtain a timestamp of a last job printed on the imaging device;

determine whether the obtained timestamp exceeds the timestamp included in the print data file;

authenticate the print data file, wherein the print data file is authenticated by determining that the print data file is not authentic if the obtained timestamp is determined to exceed the timestamp included in the print data file;

enabling the print ready file to be printed if the print data file is authentic and invalidating the print ready file if the print data file is not authentic.

17. The non-transitory computer readable storage medium according to claim 16, wherein the information pertaining to the imaging device included in the print data file includes a serial number and the information pertaining to the print ready file included in the print data file includes a page count.

18. The non-transitory computer readable storage medium according to claim 17, wherein the code is further to:

determine whether the serial number included in the print data file is authentic based upon a comparison of the included serial number with a serial number of the imaging device; and     determine whether the page count included in the print data file is authentic based upon a comparison of the print data file with a page count of the print ready file.

* * * * *